2,867,662

ACETYLENICALLY UNSATURATED COMPOUNDS

Thomas E. Londergan, Niagara Falls, N. Y., assignor to E. I. du Pont de Nemours and Company, Wilmington, Del., a corporation of Delaware No Drawing. Application November 26, 1956
Serial No. 624,202

4 Claims. (Cl. 260—583)

This application, a continuation-in-part of my copending application, Serial Number 452,450, filed August 26, 1954, now abandoned, relates to acetylenically unsaturated compounds and methods of preparing the same.

This invention has for its primary objective the provision of 1,6-diamino-2,4-hexadiynes in which the carbon atoms vicinal to the primary amino groups are completely substituted with aliphatic radicals. The preferred object is provision of 1,6-diamino-1,1,6,6-tetramethyl-2,4-hexadiyne (also known as 2,7-diamino-2,7-dimethyl-3,5-octadiyne). A further object is provision of diamino hexadiynes which on hydrogenation will yield di-primary amines suitable as intermediates for polyamides having a high degree of light stability. A still further object is the process for preparing the diamino-diynes of this invention in high yield from primary propargylamines in which the carbon atom vicinal to the amino group is completely substituted with normal aliphatic radicals, preferably methyl groups.

Because of their many remarkable properties, the polyamides have attained in a relatively short time, a high place industrially. This industrial importance is the result of their unique combination of properties, namely, high strength, good resistance to abrasion and outstanding flex life. However, in applications involving sunlight exposure, it has not been possible to realize the full industrial potential of the polyamides because of their deficient light stability. Applications in which this deficiency is manifest include awnings, flexible auto top decking, tentage, tobacco shade cloth, and the like.

Polyamides prepared from diamines in which the alpha carbon atoms (i. e. the carbon atoms vicinal to nitrogen atoms) are completely substituted with aliphatic groups show greatly improved light stability as compared with polyamides prepared from diamines in which these carbon atoms are unsubstituted or only partially substituted. Substitution of the alpha carbon atoms of the dibasic acids used in polyamide preparation has little or no effect on light stability. This invention provides valuable new intermediates for the preparation of light stable polyamides.

It has heretofore been shown by Rose et al., British Patent 619,206 (March 4, 1949) that certain diynes containing secondary and tertiary amino groups can be produced by oxidation of secondary and tertiary propargylamines in the presence of a cuprous catalyst. These diynes have the structural formula:

RR'N·CHR"·C≡C·C≡C·CHR"·NRR' wherein R stands for a hydrocarbon radical and R' and R" stand for hydrocarbon radicals or hydrogen. These products differ from the diamino-diynes of this invention in that they will not yield on hydrogenation di-primary amines in which the carbon atoms vicinal to the nitrogen atoms are completely substituted with aliphatic radicals. Consequently, they cannot be used as intermediates for the production of light stable polyamides. Furthermore, the secondary and tertiary amines obtained on hydrogenating these prior art diynes are unsatisfactory polyamide intermediates. Di-tertiary amines cannot be converted to polyamides and di-secondary amines react more slowly with dicarboxylic acids than primary amines and yield low melting polyamides (Carothers, U. S. P. 2,130,948 (September 20, 1938), page 2, lines 54–8).

The unique diynes of this invention have the structural formula:

H₂N·CRR'·C≡C·C≡C·CRR'·NH₂ 

wherein R and R' stand singly for n-alkyl radicals containing 1 to 3 carbon atoms or each RR' pair taken together stand for the bivalent aliphatic radicals: tetramethylene, —CH₂·CH₂·CH₂·CH₂— or pentamethylene, —CH₂·CH₂·CH₂·CH₂·CH₂—. However, as previously stated, the preferred product is 1,6-diamino-1,1,6,6-tetramethyl-2,4-hexadiyne. This product is also known as 2,7-diamino-2,7-dimethyl-3,5-octadiyne. However, since this invention deals exclusively with compounds which may be regarded as substituted 2,4-hexadiynes, for purposes of simplicity they will be named throughout as 2,4-hexadiyne derivatives.

A partial list of the 1,6-diamino-2,4-hexadiynes of this invention are as follows:

1,6-diamino-1,1,6,6-tetramethyl-2,4-hexadiyne
1,6-diamino-1,6-dimethyl-1,6-diethyl-2,4-hexadiyne
1,6-diamino-1,1,6,6-tetraethyl-2,4-hexadiyne
1,6-diamino-1,6-dimethyl-1,6-di-n-propyl-2,4-hexadiyne
1,6-diamino-1,6-diethyl-1,6-di-n-propyl-2,4-hexadiyne
1,6-diamino-1,1,6,6-bis(tetramethylene)-2,4-hexadiyne
1,6-diamino-1,1,6,6-bis(pentamethylene)-2,4-hexadiyne It has now been found that primary propargylamines in which the carbon atom vicinal to the amino group is completely substituted with aliphatic groups can be readily converted to the 1,6-diamino-2,4-hexadiynes of this invention in high yield, namely, about 90% of the theory or better, by exposure to oxygen in the presence of a cuprous catalyst. This is entirely unexpected since unsubstituted propargylamine reacts slowly and gives low yields (viz. less than 25% of the theory) of the corresponding diyne when subjected to the same treatment. In the preparation of 1,6-diamino-1,1,6,6-tetramethyl-2,-4-hexadiyne from the corresponding dimethyl propargylamine (NH₂·C(CH₃)₂·C≡CH), the reaction is exothermic, extremely rapid and involves little more than the theoretical amount of oxygen.

The successful preparation of the substituted diaminohexadiynes of this invention cannot be predicated from the prior art since primary amino groups are more reactive than secondary or tertiary amino groups and tend to give products involving reaction of the active hydrogen atoms on nitrogen rather than the hydrogen atom on the triple bonded acetylenic carbon atom. Such side reactions would be expected to yield aldehydes, secondary and tertiary propargylamines, substituted hydroxylamines, hydrazides, etc. Aromatic primary and secondary amines are, for example, readily oxidized whereas tertiary aromatic amines are relatively stable in this respect. The occurrence of oxidation by-products is definitely indicated when unsubstituted propargylamine is oxidized since the yield of diyne based on oxygen consumption is extremely low.

The coupling reaction of this invention is indicated by the equation:

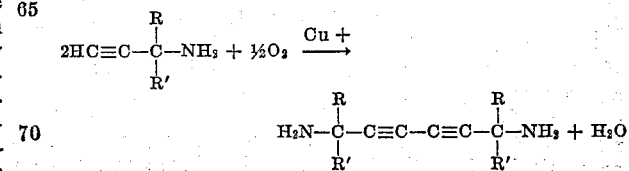

wherein R and R' are n-alkyl radicals containing 1 to 3 carbon atoms or the RR' pair is a bivalent tetramethylene or pentamethylene radical. The reaction is most conveniently carried out in aqueous solution or slurry at somewhat elevated temperatures and ambient pressures. Around 25°–100° C. is adequate although higher temperatures and corresponding autogeneous pressures may also be used. The concentration of the compound to be coupled is not critical and may be varied up to saturation. Cuprous chloride is generally employed as the catalyst although other cuprous compounds may be used as well.

A source of oxygen is, of course, essential. Exposure of the reaction vessel to air at atmospheric pressure is adequate although the reaction is slow unless agitation is to be provided. Shaking the vessel or stirring it with a mechanical stirrer provides desired agitation. Alternatively, air may be bubbled through the solution to provide both oxygen and agitation. Oxygen, itself, or any other inert gas containing free oxygen may be substituted for air.

The invention is illustrated in detail by the following examples:

EXAMPLE 1

This example shows the preparation of 1,6-diamino-1,1,6,6-tetramethyl-2,4-hexadiyne. The equation for the reaction is:

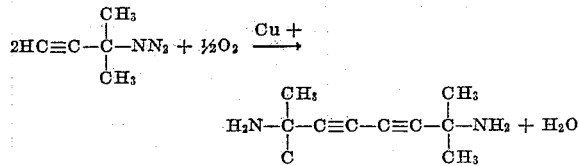

1,1-dimethylpropargylamine (8.31 parts), water (20 parts), cuprous chloride (9.9 parts) and concentrated aqueous ammonia (20.5 parts) were placed in an Erlenmeyer flask connected to a source of oxygen gas. The mixture was shaken for 3 hours. In this period, oxygen equivalent to 99.6% of the theoretical amount required for the coupling reaction was absorbed. Heat evolved by the reaction raised the temperature of the mixture of 60° C. in about 10 minutes. The reaction mixture was filtered and the filtrate extracted continuously with ether for 18 hours. Removal of the ether from the extract yielded 7.47 parts of the diaminotetramethyl hexadiyne as reddish brown crystals. This amounts to a yield of about 91% of the theory based on either the dimethyl propargyl-amine charged or the oxygen consumed.

The product was recrystallized for purposes of analysis from petroleum ether as white needles with a melting point of 50–62.6° C.

| Analysis | C | H | N |
| --- | --- | --- | --- |
| Calculated for $C_{10}H_{8}N_{2}$ | 73.2 | 9.8 | 17.0 |
| Found | 73.3 | 9.6 | 17.3 |

This 1,6-diamino-1,1,6,6-tetramethyl-2,4-hexadiyne was readily hydrogenated to 1,1,6,6-tetramethyl hexamethylene diamine in ethanol solution at room temperature in the presence of a platinum catalyst.

EXAMPLE 2

This example shows the production of 1,6-diamino-2,4-hexadiyne from unsubstituted propargylamine for purposes of comparison with Example 1.

Propargylamine (8.25 parts) was added to a solution of 48 parts of ammonium chloride and 14.83 parts of cuprous chloride in 150 parts of water. The yellowish green precipitate was filtered under an atmosphere of nitrogen, then suspended in 36.5 parts of concentrated ammonia in 50 parts of water. This mixture was agitated under an atmosphere of oxygen. After one hour 90% of the theoretical amount of oxygen was absorbed. The reaction mixture was filtered and the filtrate concentrated to dryness under vacuum. Hexadiyne (0.8 parts) was obtained from the residue. This amounts to an approximately 10% of theory yield on propargylamine and an 11% yield based on the oxygen absorbed.

EXAMPLE 3

This illustrates the preparation of 1,6-diamino-2,4-hexadiyne under somewhat different reaction conditions.

Propargylamine (13.74 parts) and water (250 parts containing 9 parts of hydrogen chloride and 2.47 parts of cuprous chloride) were placed in a glass container under an oxygen atmosphere. Oxygen was supplied at atmospheric pressure. The reaction mixture was heated to 50–60° C. with an infrared lamp and shaken for a period of 29 hours. During this period the oxygen absorbed was approximately 150% of that theoretically required for the coupling reaction. The reaction mixture was filtered and the filtrate evaporated to dryness at 25–50° C. and a pressure of 3–5 mm. of mercury. The residue from the evaporation was slurried with a solution of 30 parts of sodium hydroxide and 50 parts of water and the slurry extracted with 1000 parts of ether. Evaporation of the ether gave 3 parts of 1,6-diamino-2,4-hexadiyne as yellowish white needles. This is equivalent to a yield of 22% of the theoretical based on propargylamine and 15% based on the oxygen consumption.

Recrystallization of the diamino hexadiyne for purposes of analysis gave needles melting at 104–105° C.

| Analysis | C | H |
| --- | --- | --- |
| Calculated for $C_{6}H_{8}N_{2}$ | 66.7 | 7.5 |
| Found | 67.0 | 6.7 |

On reaction with aqueous hydrogen chloride, it yielded the dihydrochloride which melted at 265–270° C. after recrystallization from ethanol-ether.

| Analysis | C | H | N |
| --- | --- | --- | --- |
| Calculated for $C_{6}H_{8}N_{2} \cdot 2HCl$ | 39.8 | 5.5 | 15.5 |
| Found | 40.2 | 5.5 | 16.2 |

EXAMPLE 4

This illustrates the preparation and evaluation of a polyamide from 1,1,6,6-tetramethylhexamethylenediamine, namely, polytetramethylhexamethylenediamine sebacamide,

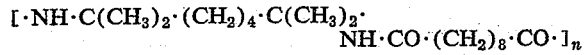

A charge consisting of 19.83 parts of 1,1,6,6-tetramethylhexamethylenediamine, 44.49 parts of diphenyldithiolsebacate, and 16 parts of purified p-xylene was placed in a glass tube. The tube was swept with oxygen-free nitrogen, evacuated, and sealed. The charge, sealed tube was heated from 150° C. to 210° C. in 30 minutes and held at 210° C. for an hour. It was then opened and heated for 30 minutes at 255° C. under one atmosphere pressure. The pressure was thereafter reduced to 3–4 mm. and the heating at 255° C. continued for an additional 30 minutes. There was obtained 35 parts of a polymer having an inherent viscosity of 1.28 and which was clear and tough. Residual thiophenol was removed from the polymer by dissolving it in 550 parts of boiling dimethylformamide and precipitating by pouring the dimethylformamide solution into a large volume of concentrated aqueous ammonia. After washing with water and drying at 100° C., the polymer had an inherent viscosity of 1.31. A film of the purified polymer was still tough after 200 hours exposure to ultraviolet light and the polymer had an inherent viscosity of 1.28.

In contrast to the above, a film from a polyhexamethyleneadipamide having an inherent viscosity 0.85, exposed at the same time, was brittle after 200 hours and the inherent viscosity was 0.72.

EXAMPLE 5

This demonstrates the superior light stability of yarns prepared from a hexamethylenediamine in which the alpha carbon atoms were completely substituted as compared with yarns derived from homologous diamines in which the alpha carbons were partially substituted and unsubstituted. The diamines and dicarboxylic acids from which these yarns, designated as I, II and III, were derived is indicated below:

| Yarn No. | Diamine | Diacid |
|---|---|---|
| I | $H_2N.C(CH_3)_2-(CH_2)_4-C(CH_3)_2-NH_2$ | $HOOC.(CH_2)_8.COOH$ |
| II | $H_2N.CH(CH_3)-(CH_2)_4-CH(CH_3)-NH_2$ | $HOOC-C(CH_3)_2-(CH_2)_4-C(CH_3)_2-COOH$ |
| III | $H_2N.(CH_2)_6.NH_2$ | $HOOC-(CH_2)_4-COOH$ |

Polyamides yarns I, II and III were made from the above designated amines and acids by conventional procedures. The yarns were subjected to equivalent exposure to ultraviolet light and compared with respect to tensile strength and elongation after various exposure periods. The results are tabulated in the following table.

Table
EFFECT OF U. V. LIGHT ON POLYAMIDE YARNS

| Hours' exposure | Tensile strength in grams per denier/elongation in percent | | |
|---|---|---|---|
| | Yarn I | Yarn II | Yarn III |
| 0 | 3.4/42 | 2.8/51 | 5.8/20 |
| 200 | 3.5/36 | 2.5/46 | 3.4/9 |
| 400 | 3.0/31 | 2.1/25 | 1.1/4 |
| 600 | 2.9/36 | 1.6/27 | 0.9/2 |
| 800 | 2.9/30 | | |
| 1,000 | 2.9/32 | | |

It will be noted that the behaviour of Yarn II also demonstrates that substitution of the alpha carbon atoms in the dibasic acid from which a polymer is derived has little or no effect on light stability.

Having described my invention, I claim:

1. A 1,6-diamino-2,4-hexadiyne containing two primary amino groups and in which each carbon atom vicinal to each nitrogen atom is completely substituted by aliphatic radicals selected from the group consisting of methyl, ethyl, n-propyl, tetramethylene and pentamethylene groups.

2. 1,6-diamino-1,1,6,6-tetramethyl-2,4-hexadiyne.

3. The method of preparing in high yield a 1,6-diamino-2,4-hexadiyne in which the carbon atoms vicinal to the nitrogen atoms are completely substituted by aliphatic radicals which comprises coupling a primary propargylamine in which the carbon atom vicinal to the nitrogen atom is completely substituted by aliphatic radicals selected from the group consisting of methyl, ethyl, n-propyl, tetramethylene and pentamethylene by reaction with oxygen in the presence of a cuprous catalyst.

4. The method of preparing 1,6-diamino-1,1,6,6-tetramethyl-2,4-hexadiyne in high yield by reacting 1,1-dimethyl propargylamine with oxygen in the presence of a cuprous catalyst.

References Cited in the file of this patent
FOREIGN PATENTS
619,206    Great Britain _____ Mar. 4, 1949

UNITED STATES PATENT OFFICE

Certificate of Correction

Patent No. 2,867,662                                January 6, 1959

Thomas E. Londergan

It is hereby certified that error appears in the printed specification of the above numbered patent requiring correction and that the said Letters Patent should read as corrected below.

Column 3, line 30, for that portion of the equation reading "—NN$_2$ +" read— —NH$_2$ +—; lines 34 and 35, for that portion of the equation reading $$\overset{|}{C} \quad \text{read} \quad \overset{|}{C}_{H_3}$$

line 54, for "50–62.6° C." read —50–52.6° C.—; column 6, line 8, for "polymer" read —polyamide—.

Signed and sealed this 28th day of April 1959.

[SEAL]

Attest:
T. B. MORROW,                                          ROBERT C. WATSON,
*Attesting Officer.*                                        *Commissioner of Patents.*